United States Patent
Srinivasan

(10) Patent No.: US 11,715,171 B2
(45) Date of Patent: *Aug. 1, 2023

(54) DETECTING WATERMARK MODIFICATIONS

(71) Applicant: The Nielsen Company (US), LLC, New York, NY (US)

(72) Inventor: Venugopal Srinivasan, Tarpon Springs, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 224 days.

This patent is subject to a terminal disclaimer.

(21) Appl. No.: 17/157,668

(22) Filed: Jan. 25, 2021

(65) Prior Publication Data
US 2021/0142437 A1 May 13, 2021

Related U.S. Application Data

(63) Continuation of application No. 16/524,946, filed on Jul. 29, 2019, now Pat. No. 10,902,542, which is a (Continued)

(51) Int. Cl.
*G06T 1/00* (2006.01)
*G10L 19/018* (2013.01)

(52) U.S. Cl.
CPC .......... *G06T 1/0028* (2013.01); *G06T 1/0071* (2013.01); *G10L 19/018* (2013.01); *G06T 2201/0202* (2013.01)

(58) Field of Classification Search
CPC ................. G06T 1/0028; G06T 1/0071; G06T 2201/0202; G06T 1/0021; G06T 2201/0065; G10L 19/018
(Continued)

(56) References Cited

U.S. PATENT DOCUMENTS 5,450,490 A   9/1995  Jensen et al.
5,764,763 A   6/1998  Jensen et al.
(Continued)

FOREIGN PATENT DOCUMENTS

WO   2015088328   6/2015

OTHER PUBLICATIONS

United States Patent and Trademark Office, "Notice of Allowance," mailed in connection with U.S. Appl. No. 15/274,846, dated Jun. 11, 2018, 9 pages.
(Continued)

*Primary Examiner* — Ishrat I Sherali
(74) *Attorney, Agent, or Firm* — Hanley, Flight & Zimmerman, LLC

(57) ABSTRACT

Methods, apparatus and articles of manufacture (e.g., computer readable media) to detect watermark modifications are disclosed. Example apparatus disclosed herein include means for encoding a first watermark in a first media signal obtained from an output of a media device to obtain a second media signal encoded with the first watermark and a second watermark, the second watermark already encoded in the first media signal obtained from the output of the media device. Disclosed example apparatus also include means for decoding the first watermark and the second watermark from the second media signal to determine a first metric corresponding to the first watermark and a second metric corresponding to the second watermark. Disclosed example apparatus further include means for outputting, based on the first metric and the second metric, an indication of whether the second watermark has been modified.

20 Claims, 4 Drawing Sheets

Related U.S. Application Data continuation of application No. 16/158,007, filed on Oct. 11, 2018, now Pat. No. 10,366,466, which is a continuation of application No. 15/274,846, filed on Sep. 23, 2016, now Pat. No. 10,102,602.

(60) Provisional application No. 62/259,410, filed on Nov. 24, 2015.

(58) Field of Classification Search
USPC .......................................................... 382/100
See application file for complete search history.

(56) References Cited

U.S. PATENT DOCUMENTS

| | | | |
|---|---|---|---|
| 6,845,360 B2 | 1/2005 | Jensen et al. | |
| 6,871,180 B1 | 3/2005 | Neuhauser et al. | |
| 7,072,487 B2 * | 7/2006 | Reed | G06T 1/0042 |
| | | | 382/162 |
| 7,140,043 B2 | 11/2006 | Choi et al. | |
| 7,246,239 B2 * | 7/2007 | Rodriguez | H04N 17/004 |
| | | | 726/32 |
| 7,277,468 B2 | 10/2007 | Tian et al. | |
| 7,321,666 B2 * | 1/2008 | Kunisa | G06T 1/0028 |
| | | | 713/176 |
| 7,336,800 B2 | 2/2008 | Miranda et al. | |
| 7,454,034 B2 * | 11/2008 | Tewfik | G06T 1/0028 |
| | | | 713/176 |
| 7,502,759 B2 | 3/2009 | Hannigan et al. | |
| 7,587,601 B2 * | 9/2009 | Levy | H04N 21/8358 |
| | | | 713/168 |
| 7,607,016 B2 * | 10/2009 | Brunk | G06T 1/0042 |
| | | | 713/176 |
| 7,656,930 B2 * | 2/2010 | Tian | H04N 17/004 |
| | | | 380/201 |
| 7,681,039 B2 | 3/2010 | Yacobi et al. | |
| 8,006,092 B2 | 8/2011 | Rodriguez et al. | |
| 8,345,569 B2 * | 1/2013 | Bloom | G06T 1/0021 |
| | | | 370/252 |
| 8,490,128 B2 | 7/2013 | Davis et al. | |
| 10,102,602 B2 * | 10/2018 | Srinivasan | G06T 1/0028 |
| 10,147,433 B1 * | 12/2018 | Bradley | G10L 19/018 |
| 10,366,466 B2 * | 7/2019 | Srinivasan | G10L 19/018 |
| 10,902,542 B2 * | 1/2021 | Srinivasan | G06T 1/0071 |
| 2002/0157005 A1 * | 10/2002 | Brunk | G06T 1/0071 |
| | | | 713/176 |
| 2004/0071311 A1 | 4/2004 | Choi et al. | |
| 2004/0240529 A1 * | 12/2004 | Leonard | H04L 1/0045 |
| | | | 375/148 |
| 2005/0135614 A1 * | 6/2005 | Hollar | H04N 21/8358 |
| | | | 380/201 |
| 2005/0276248 A1 * | 12/2005 | Butala | H04W 52/20 |
| | | | 370/332 |
| 2010/0182989 A1 * | 7/2010 | Ramesh | H04L 27/2647 |
| | | | 370/344 |
| 2010/0280641 A1 * | 11/2010 | Harkness | H04H 20/86 |
| | | | 700/94 |
| 2011/0264455 A1 * | 10/2011 | Nelson | H04H 60/58 |
| | | | 704/E19.009 |
| 2012/0214594 A1 * | 8/2012 | Kirovski | A63F 13/213 |
| | | | 463/36 |
| 2017/0148126 A1 | 5/2017 | Srinivasan | |
| 2019/0043152 A1 | 2/2019 | Srinivasan | |
| 2019/0347756 A1 | 11/2019 | Srinivasan | |

OTHER PUBLICATIONS

United States Patent and Trademark Office, "Non-final Office Action," mailed in connection with U.S. Appl. No. 15/274,846, dated Dec. 15, 2017, 14 pages.

United States Patent and Trademark Office, "Notice of Allowance," mailed in connection with U.S. Appl. No. 16/158,007, dated Mar. 15, 2019, 8 pages.

United States Patent and Trademark Office, "Non-final Office Action," mailed in connection with U.S. Appl. No. 16/158,007, dated Nov. 9, 2018, 7 pages.

United States Patent and Trademark Office, "Notice of Allowance," mailed in connection with U.S. Appl. No. 16/524,946, dated Sep. 22, 2020, 9 pages.

United States Patent and Trademark Office, "Non-final Office Action," mailed in connection with U.S. Appl. No. 16/524,946, dated Jun. 2, 2020, 22 pages.

* cited by examiner

DETECTING WATERMARK MODIFICATIONS

RELATED APPLICATION(S)

This patent arises from a continuation of U.S. patent application Ser. No. 16/524,946 (now U.S. Pat. No. 10,902,542), which is titled "DETECTING WATERMARK MODIFICATIONS," and which was filed on Jul. 29, 2019, which is a continuation of U.S. patent application Ser. No. 16/158,007 (now U.S. Pat. No. 10,366,466), which is titled "DETECTING WATERMARK MODIFICATIONS," and which was filed on Oct. 11, 2018, which is a continuation of U.S. patent application Ser. No. 15/274,846 (now U.S. Pat. No. 10,102,602), which is titled "DETECTING WATERMARK MODIFICATIONS," and which was filed on Sep. 23, 2016, which claims the benefit of, and priority from, U.S. Provisional Application Ser. No. 62/259,410, which is titled "DETECTING WATERMARK MODIFICATIONS" and which was filed on Nov. 24, 2015. Priority to U.S. patent application Ser. No. 16/524,946, U.S. patent application Ser. No. 16/158,007, U.S. patent application Ser. No. 15/274,846 and U.S. Provisional Application Ser. No. 62/259,410 is claimed. U.S. patent application Ser. No. 16/524,946, U.S. patent application Ser. No. 16/158,007, U.S. patent application Ser. No. 15/274,846 and U.S. Provisional Application Ser. No. 62/259,410 are hereby incorporated by reference herein in their respective entireties.

FIELD OF THE DISCLOSURE

This disclosure relates generally to media watermarking and, more particularly, to detecting media watermark modifications.

BACKGROUND

Media watermarking (e.g., such as audio watermarking, video watermarking, etc.) can be used to identify media, such as television broadcasts, radio broadcasts, advertisements (television and/or radio), downloaded media, streaming media, prepackaged media, etc. Media watermarks, such as audio watermarks, are also extensively used in both radio and television to identify the station or channel to which a receiver is tuned. Existing media watermarking techniques identify media by embedding one or more codes (e.g., one or more watermarks) conveying media identifying information and/or an identifier that may be mapped to media identifying information, into an audio and/or video component of the media. To identify watermarked media, the watermark(s) are extracted and, for example, decoded and/or used to access a table of reference watermarks that are mapped to media identifying information.

BRIEF DESCRIPTION OF THE DRAWINGS

The figures are not to scale. Wherever possible, the same reference numbers will be used throughout the drawing(s) and accompanying written description to refer to the same or like parts, elements, etc.

DETAILED DESCRIPTION

Figure 1:
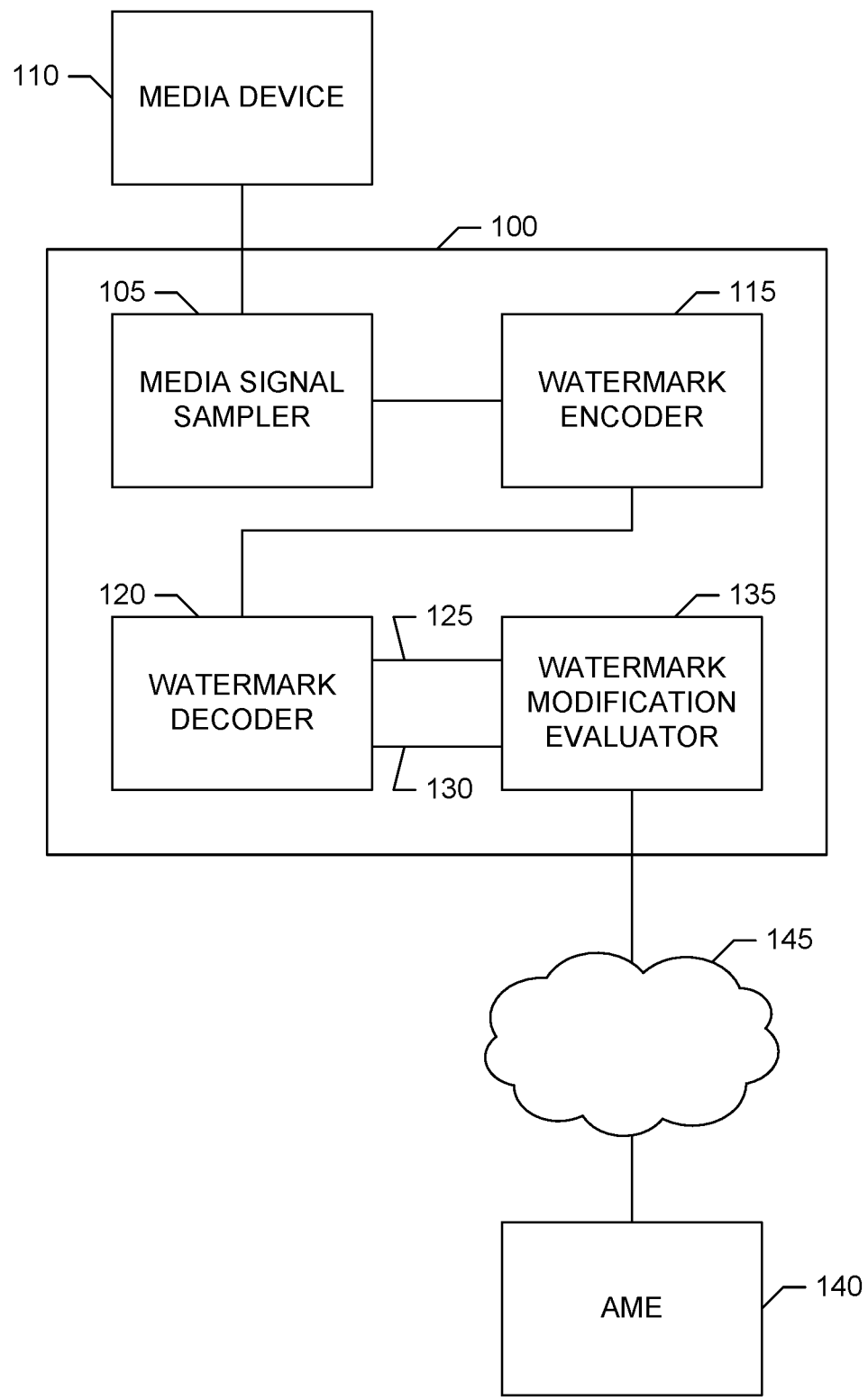
FIG. 1 is a block diagram of an example watermark modification detector implemented in accordance with the teachings of this disclosure.

Methods, apparatus, systems and articles of manufacture (e.g., physical storage media) to detect media watermark modifications are disclosed. Example watermark modification detection methods disclosed herein include encoding a second watermark in a media signal including a first watermark. Disclosed example methods also include detecting the first watermark and the second watermark in the media signal. Disclosed example methods further include, in response to detecting the first watermark and the second watermark, comparing a first strength metric determined for the first watermark and a second strength metric determined for the second watermark to determine whether the first watermark was modified prior to being encoded in the media signal.

These and other example methods, apparatus, systems and articles of manufacture (e.g., physical storage media) to detect media watermark modifications are disclosed in further detail below.

As used herein, the term "media" refers to audio and/or visual (still or moving) content and/or advertisements. Furthermore, as used herein, the term "media" includes any type of content and/or advertisement delivered via any type of distribution medium. Thus, media includes television programming or advertisements, radio programming or advertisements, movies, web sites, streaming media, etc.

As noted above, media watermarking (e.g., such as audio watermarking, video watermarking, etc.) is used to identify media, such as television broadcasts, radio broadcasts, advertisements (television and/or radio), downloaded media, streaming media, prepackaged media, etc. Media watermarks, such as audio watermarks, are also extensively used in both radio and television to identify the station or channel to which a receiver is tuned. Existing media watermarking techniques identify media by embedding one or more codes (e.g., one or more watermarks) conveying media identifying information and/or an identifier that may be mapped to media identifying information, into an audio and/or video component of the media. In some examples, the audio or video component is selected to have a signal characteristic sufficient to hide the watermark. As used herein, the terms "code" and "watermark" are used interchangeably and are defined to mean any identification information (e.g., an identifier) that may be inserted or embedded in the audio or video of media (e.g., a program or advertisement) for the purpose of identifying the media or for another purpose, such as tuning (e.g., a packet identifying header), copyright protection, etc. In some examples, to identify watermarked media, the watermark(s) are extracted and, for example, decoded and/or used to access a table of reference watermarks that are mapped to media identifying information.

For example, audio watermarks may be embedded at a broadcast facility and carry digital data in the form of symbols. In a typical application, such as television audience measurement, a metering device installed in a panelist's home senses or otherwise captures audio emanating from, for example, a television (TV) set and/or other media device(s). The metering device performs signal processing operations on the audio to extract the watermark symbols representing digital data. In some examples, the data bits conveyed by the watermark symbols identify the TV station being received by the TV set, and may also represent a timestamp to further identify media (e.g., content and/or advertisements) being received. In the case of radio audience measurement, as well as in some television audience measurement examples, the metering device may be a portable device carried by the panelist to monitor media exposure in the home, as well as in other environments, such as an automobile. Media watermarks designed for radio broadcasts tend to be more robust than media watermarks designed for television broadcasts because radio broadcasts are often heard in environments characterized by relatively high ambient acoustic noise, such as in vehicles. For example, the data packets of media watermarks for radio broadcasts may be repeated multiple times to provide redundancy.

In the case of radio audience measurement, a widely used watermark is the Critical Band Encoding Technology (CBET) watermark invented by Jensen, et al. See U.S. Pat. Nos. 5,450,490 and 5,764,763. See also U.S. Pat. Nos. 6,845,360 and 6,871,180. In CBET watermarking, each data packet includes 32 bits of which 16 bits are used for station identification and the remaining 16 bits are used for a timestamp. CBET watermarking can also be used for television audience measurement.

CBET watermarks are constructed using symbols representing 4 bits of data. Each symbol is encoded in 400 milliseconds of host audio and is created by embedding a particular set of 10 tones representing each symbol, with different sets of tones being used to represent different symbol values. Each tone belongs to a "code band" consisting of several closely spaced frequencies of the audio. The code tones are in the frequency range 1 kHz to 3 kHz in the case of CBET watermarking.

In some examples, to make these code tones imperceptible to the human ear, the amplitude of each of the tones is controlled by a "masking" energy offered by the host audio in a set of frequency bands ("code bands") in which these tones reside. Host audio that is rich in spectral energy in these code bands will support higher code tone amplitudes due to psycho-acoustic perception characteristics of the human ear. However, the masking characteristics do not remain constant across a 400 millisecond block of audio. In some examples, the masking characteristics are recalculated frequently at intervals as short as 2 milliseconds.

Even with the resulting amplitude modulation of the code tones, the code tones can be successfully detected by signal processing techniques used for watermark detection, such as a Discrete Fourier Transform (DFT) performed on an audio block of 256 milliseconds lying anywhere within the 400-millisecond block of audio to determine the respective energies of the different frequencies, or tones, included in the audio. Each of the code tones included in the watermark symbol will tend to have significantly higher energy than other members of the code band associated with that tone. In some watermark detection procedures, the energy of each potential code tone of the audio is normalized relative to (e.g., divided by) the average energy in its code band. By adding the normalized energy of the set of code tones (e.g., all the 10 tones) representing a symbol, a strength metric (or, in other words, a strength value) for the symbol may be determined. A winning symbol, representing the decoded watermark symbol, may be selected by comparing the strength metrics of all potential symbols and selecting the winning symbol to be the potential symbol with the largest strength metric. In some examples, the winning symbol is considered valid if its strength metric exceeds a threshold.

Thus, in some examples, the CBET watermark detection process performed in a metering device involves analyzing a block of audio samples corresponding to 256 milliseconds to determine the presence of a valid CBET symbol. In general, the 400 millisecond symbol block boundaries are not known to the decoding process operating in the meter. Therefore a scan operation consisting of sliding a 256 millisecond window across the audio stream is performed. This is usually performed in sliding increments that could be as large as 100 milliseconds.

In some examples, an audio component of media (also referred to as the host audio) can carry multiple watermarks, which overlap in time, using frequency multiplexing. For example, CBET watermarking supports 4 "layers" in which each layer uses distinct sets of code tones to represent its associated symbols (e.g., with different layers using different sets of code tones). In some examples of CBET watermarking for radio, just one of these layers, which is called the "local" layer, is used for encoding watermarks. In some examples of CBET watermarking for television, such as examples in which networks deliver programs to local affiliates, two (2) layers of watermarking, called the "network" layer and the "local" layer, are used for encoding watermarks.

In radio audience measurement scenarios in which much of the listening occurs in a high ambient noise environment, such as a moving automobile, the energy of the embedded watermark tones is an important factor in the successful detection of the watermarks. Spectrally rich content, such as music, typically contains more masking energy across the 10 code bands relative to content consisting of speech. To allow for these variations, the watermarks are generally repeated multiple times. For example, the CBET watermark message consists of 12 symbols and the total duration is 12×0.4=4.8 seconds. In some such examples, the same watermark message, including station identification and timestamp, is repeated for an entire minute of audio. The detection process takes advantage of this redundancy, namely, every 400 millisecond block that is separated in time by 4.8 seconds is likely to carry the same symbol or, in other words, the same set of 10 tones. The watermark symbol tone energies can be summed across blocks separated by 4.8 seconds to yield a significantly more robust watermark decoding result. Thus, in some such examples, even spectrally weak content, such as speech, yields a few detections every minute.

Recently, watermark boosting devices, such as the VOLTAIR® device, that boost CBET code tones at the broadcast facility have been introduced. These devices perform a training procedure in which the differences between the input and output signals of a CBET watermark encoder are determined by buffering and analyzing samples of audio input to the CBET watermark encoder as well as the samples produced at the output of the CBET watermark encoder. The resulting differences determined by the training procedure yield the 10 frequency tones associated with a watermark symbol, along with their current amplitude. The watermark boosting devices then increase the amplitudes of the watermark symbol code tones by using more aggressive psycho-acoustic models, especially if longer buffers than those employed by the CBET encoder are used. The recomputed or enhanced code tones are added to the original input and sent as the watermarked audio output to generate a new watermarked version of the audio with potential higher detection rates. Some watermark boosting devices have settings that allow an operator to choose boost values in the range from 0 to 25. However, such watermark boosting can lead to audible artifacts that corrupt the host audio.

Thus, there is a need to be able to detect whether watermarks embedded in media signals have been artificially boosted, which can lead to skewed detection rates, corrupted audio, etc. Turning to the figures, a block diagram of an example watermark modification detector 100 implemented in accordance with the teachings of this disclosure is illustrated in FIG. 1. The watermark modification detector 100 of the illustrated example examines watermarked media (e.g., watermarked audio) to passively detect the presence of watermark boosting and, by extension, whether a watermark boosting device is being employed by a media source (e.g., a radio or television station).

In the illustrated example of FIG. 1, the watermark modification detector 100 includes an example media signal sampler 105 to capture a sample of a media signal, such as an audio signal, output from, for example, an example media device 110 tuned to a radio station or a television station to be examined. For example, the media signal sampler 105 may include a microphone and/or a line input to capture 10 minutes, or some other duration, of audio output from the media device 110. The example media device 110 may be implemented by any media device, such as a radio, a television, a computer, a smartphone, a tablet, etc. In the following description, the media signal sampled and processed by the watermark modification detector 100 is assumed to be an audio signal. However, in other examples, the media signal sampled and processed by the watermark modification detector 100 could be a video signal and/or some other media signal output by the media device 110.

The example watermark modification detector 100 also includes an example watermark encoder 115 to encode a watermark into an unused watermarking layer in the audio signal sampled by the media signal sampler 105. As described above, multiple layers of watermarking can coexist due to frequency multiplexing. For example, as noted above, CBET watermark encoders for radio stations use a first layer, namely, the "local" layer for inserting CBET watermarks. Thus, in some such examples, the watermark encoder 115 implements a CBET watermark encoded to encode a watermark into the captured audio using a second layer, namely, the "network" layer supported the CBET encoder. As another example, and as noted above, CBET watermark encoders for television stations may use a first layer, namely, the "local" layer, and a second layer, namely, the "network" layer for inserting CBET watermarks. Thus, in some such examples, the watermark encoder 115 encodes a watermark into the captured audio using a third unused layer of the four possible watermarking layers. In general, if the audio signal sampled by the media signal sampler 105 can include a first (e.g., original) watermark in a first one of the watermarking layers, the watermark encoder 115 encodes a second (e.g., added) watermark in a second (e.g., unused) one of the watermarking layers.

The example watermark modification detector 100 further includes an example watermark decoder 120 to analyze the sampled audio encoded by the watermark encoder 115 with the additional watermark in the unused watermarking layer. In some examples, the watermark decoder 120 is implemented by a modified CBET watermark decoder, which performs a sliding 256-millisecond DFT block analysis, as described above, to detect CBET watermark symbols. For each detected symbol, if it is valid (e.g., if its detected sum of normalized code tone energies exceeds a threshold), the symbol's strength metric (e.g., the value of the sum of normalized code tone energies for the symbol) is stored in an array. In some examples, separate arrays are used for the original watermark symbols (e.g., the "local" layer symbols in the case of radio watermarking) and the added watermark symbols encoded by the watermark encoder 115 (e.g., the "network" layer symbols in the case of radio watermarking).

In the illustrated example, the watermark decoder 120 outputs the decoded watermark symbols via an example symbol output 125 and the symbol strength metrics for the decoded symbols via an example strength output 130. These outputs are provided to an example watermark modification evaluator 135 included in the example watermark modification detector 100, which compares the strength metrics for the original watermark symbols (e.g., the "local" layer symbols in the case of radio watermarking) and the strength metrics for the added watermark symbols encoded by the watermark encoder 115 (e.g., the "network" layer symbols in the case of radio watermarking) to determine whether the original watermark symbols underwent boosting by a watermark boosting device prior to being encoded in the audio signal. For example, when its analysis of the 10 minutes of captured audio is completed, the watermark decoder 120 outputs strength metrics for the original watermark symbols and the added watermark symbols detected during that analysis interval. The example watermark modification evaluator 135 then combines (e.g., averages) the strength metrics for the original watermark symbols to determine a combined (e.g., average) symbol strength metric for the original watermark symbols (e.g., the local layer symbols). The watermark modification evaluator 135 of the illustrated example also combines (e.g., averages) the strength metrics for the added watermark symbols to determine a combined (e.g., average) symbol strength metric for the added watermark symbols (e.g., the network layer symbols).

Next, the example watermark modification evaluator 135 compares the combined (e.g., average) symbol strength metric for the added watermark symbols with the combined (e.g., average) symbol strength metric for the original watermark symbols. The combined (e.g., average) symbol strengths of the added (e.g., "network" layer) watermark and the original (e.g., "local" layer) watermark should, under normal circumstances, be approximately the same because the host audio's masking capability computed by the watermark encoder 115 when encoding the added watermark symbols should be the same as, or at least similar to, the host audio's masking capability computed by the watermark encoder that encoded the original watermark symbols. However, if a more aggressive masking model is employed by the original watermark encoder, as in the case of the watermark boosting devices described above, the combined (e.g., average) symbol strength for the original watermark symbols will typically be larger than the combined (e.g., average) symbol strength metric for the added watermark symbols. Thus, if the combined (e.g., average) symbol strength for the original (e.g., local layer) watermark symbols is less than or equal to, or just slightly higher than (e.g., within a threshold amount of) the combined (e.g., average) symbol strength metric for the added (e.g., network layer) watermark symbols, the watermark modification evaluator 135 indicates or otherwise determines that the original watermark did not undergo boosting and, thus, no watermark boosting device (or other enhancement device) is in operation at the media source (e.g., radio or television station). Otherwise, if the combined (e.g., average) symbol strength for the original (e.g., local layer) watermark symbols is greater than (e.g., by a threshold amount of) the combined (e.g., average) symbol strength metric for the added (e.g., network layer) watermark symbols, the watermark modification evaluator 135 indicates or otherwise determines that the original watermark did undergo boosting and, thus, a watermark boosting device (or other enhancement device) is in operation at the media source (e.g., radio or television station).

In the illustrated example, the watermark modification evaluator 135 reports a watermark modification report including its determination as to whether a watermarked media signal has undergone boosting to an audience measurement entity (AME) 140, such as The Nielsen Company (US), LLC. For example, the watermark modification evaluator 135 may transmit its watermark modification report to the AME 140 via an example network 145. The example network 145 may correspond to the Internet and/or any other communication network or combination of networks. In some examples, a ratings server and/or other computing device at the AME 140 receives the report (or message, signal, etc.) indicating whether the watermarked media signal has undergone boosting and uses that information to, for example, adjust or discard ratings data determined for media, a station, a source, etc., corresponding to the watermarked media signal.

Figure 2:
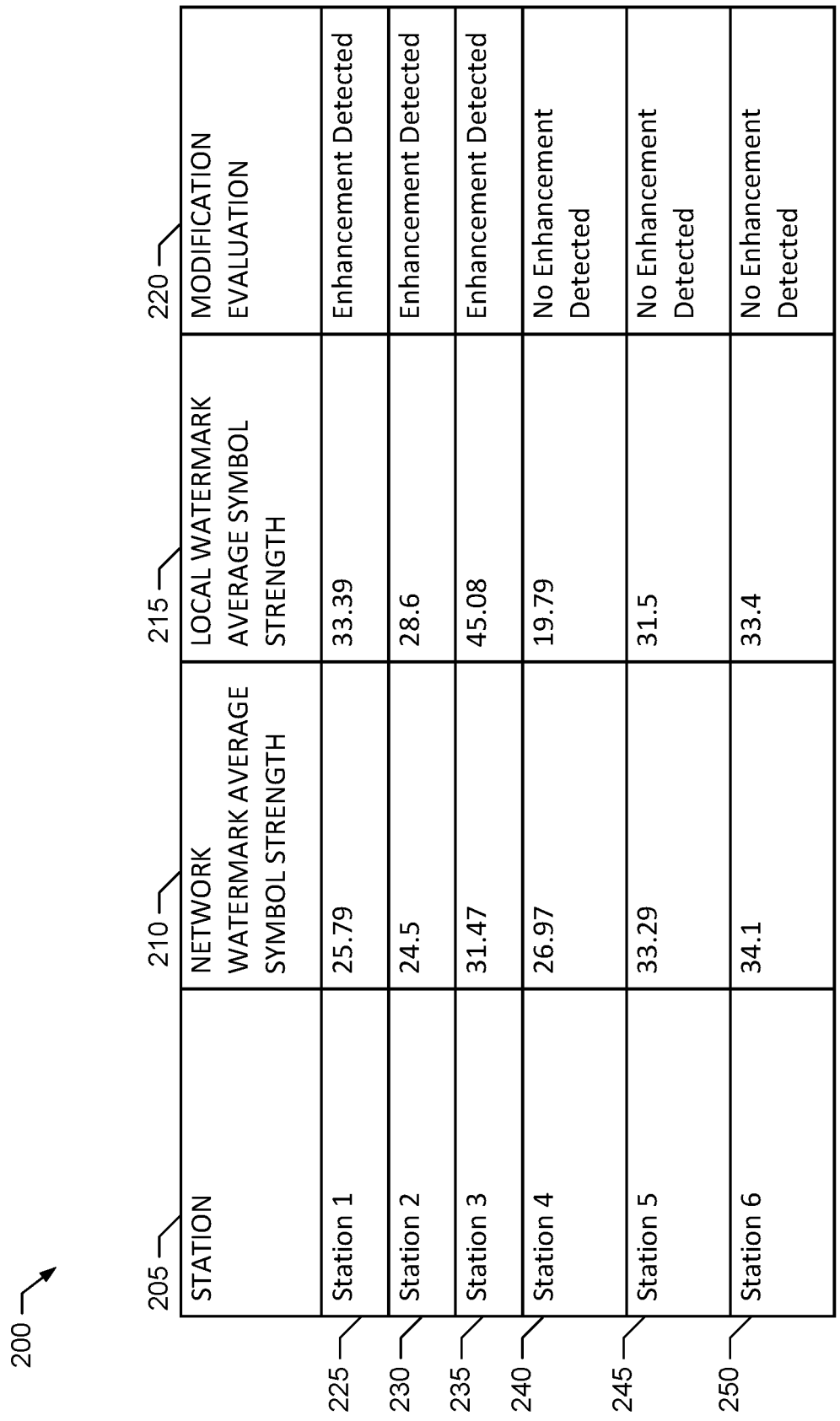
FIG. 2 is a table listing example results output from the example watermark modification detector of FIG. 1.

An example watermark modification report 200 capable of being output by the example watermark modification detector 100 is represented by the table illustrated in FIG. 2. The example watermark modification report 200 includes an example station column 205 to identify the radio and/or network station whose media signals were analyzed by the watermark modification detector 100 to determine whether the watermarks encoded in the broadcast media signals have been modified (e.g., boosted or otherwise enhanced). The example watermark modification report 200 also includes an example network average symbol strength column 210 to list the average symbol strength metrics computed for the added (e.g., network layer) watermark symbols encoded into a station's media signal by the watermark modification detector 100. The example watermark modification report 200 further includes an example local average symbol strength column 215 to list the average symbol strength metrics computed for the original (e.g., local layer) watermark symbols originally encoded into a station's media signal prior to analysis by the watermark modification detector 100. The example watermark modification report 200 includes an example modification evaluation column 220 to list the determination made by the watermark modification detector 100 as to whether the original watermark symbols encoded into a station's media signal have undergone modification (e.g., boosting or other enhancement).

In the illustrated example of FIG. 2, the watermark modification report 200 includes six (6) example rows 225-250 providing the results for six (6) example stations, Station 1 through Station 6. In the illustrated example of FIG. 2, the watermark modification detector 100 uses a threshold of four (4) to determine whether the original watermark symbols encoded into a station's media signal have undergone modification (e.g., boosting or other enhancement). Thus, in the example watermark modification report 200 of FIG. 2, the modification evaluation column 220 indicates that the watermark modification detector 100 determined that the media signals for Station 1, Station 2 and Station 3 underwent watermark enhancement (e.g., boosting), because, for each of these stations, the average symbol strength metric computed for the original (e.g., local layer) watermark symbols is greater than the average symbol strength metric computed for the added (e.g., network layer) watermark symbols by at least the threshold amount (e.g., 4 in this example). Conversely, in the example watermark modification report 200 of FIG. 2, the modification evaluation column 220 indicates that the watermark modification detector 100 determined that the media signals for Station 4, Station 5 and Station 6 did not undergo watermark enhancement (e.g., boosting), because, for each of these stations, the average symbol strength metric computed for the original (e.g., local layer) watermark symbols was not greater than the average symbol strength metric computed for the added (e.g., network layer) watermark symbols by at least the threshold amount (e.g., 4 in this example).

While an example manner of implementing the example watermark modification detector 100 is illustrated in FIG. 1, one or more of the elements, processes and/or devices illustrated in FIG. 1 may be combined, divided, re-arranged, omitted, eliminated and/or implemented in any other way. Further, the example media signal sampler 105, the example watermark encoder 115, the example watermark decoder 120, the example watermark modification evaluator 135 and/or, more generally, the example watermark modification detector 100 of FIG. 1 may be implemented by hardware, software, firmware and/or any combination of hardware, software and/or firmware. Thus, for example, any of the example media signal sampler 105, the example watermark encoder 115, the example watermark decoder 120, the example watermark modification evaluator 135 and/or, more generally, the example watermark modification detector 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example watermark modification detector 100, the example media signal sampler 105, the example watermark encoder 115, the example watermark decoder 120 and/or the example watermark modification evaluator 135 is/are hereby expressly defined to include a tangible computer readable storage device or storage disk such as a memory, a digital versatile disk (DVD), a compact disk (CD), a Blu-ray disk, etc. storing the software and/or firmware. Further still, the example watermark modification detector 100 may include one or more elements, processes and/or devices in addition to, or instead of, those illustrated in FIG. 1, and/or may include more than one of any or all of the illustrated elements, processes and devices.

Figure 3:
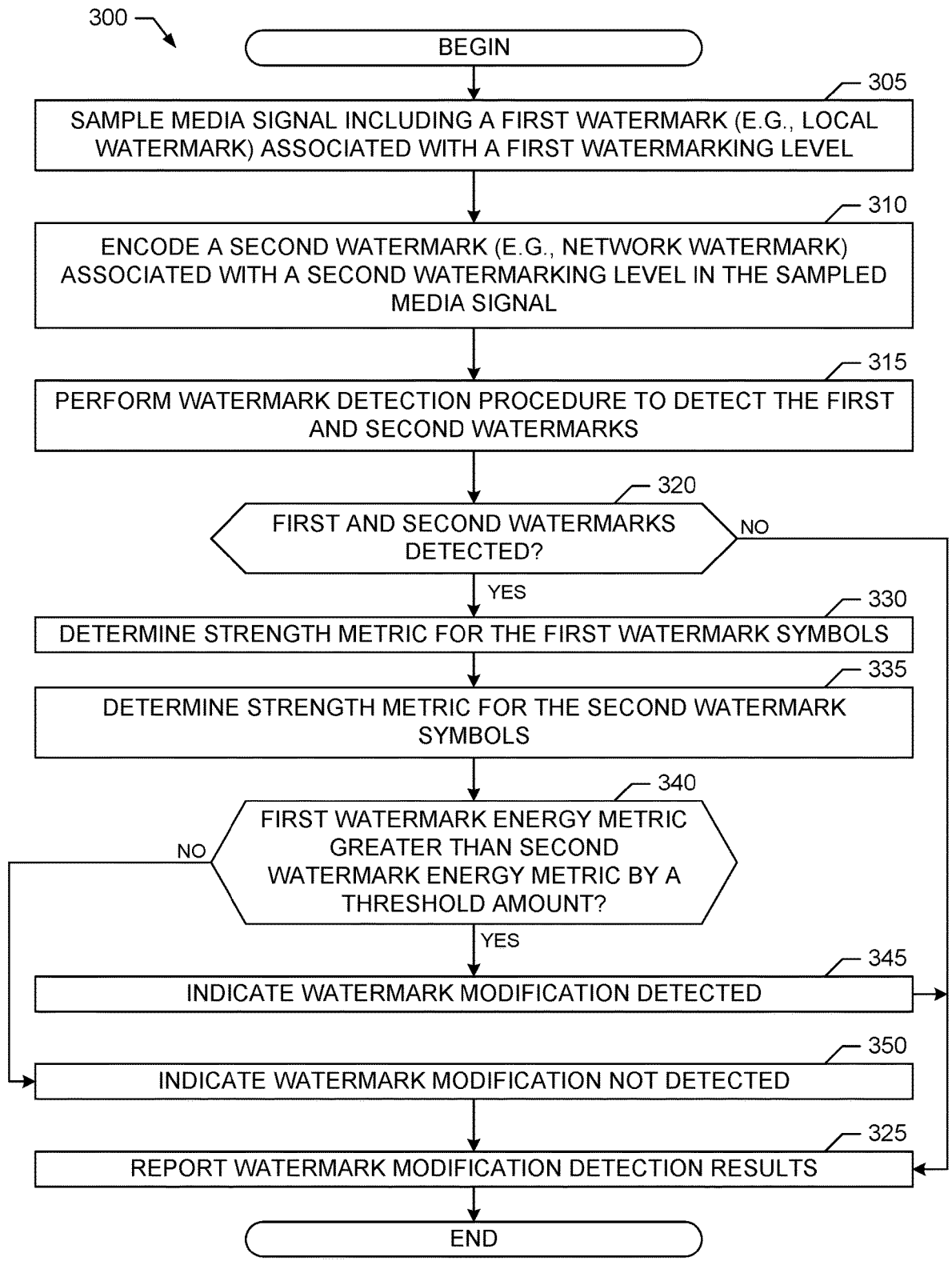
FIG. 3 is a flowchart representative of example machine readable instructions that may be executed to implement the example watermark modification detector of FIG. 1.

A flowchart representative of example machine readable instructions for implementing the example watermark modification detector 100, the example media signal sampler 105, the example watermark encoder 115, the example watermark decoder 120 and/or the example watermark modification evaluator 135 is shown in FIG. 3. In this example, the machine readable instructions comprise one or more programs for execution by a processor, such as the processor 412 shown in the example processor platform 400 discussed below in connection with FIG. 4. The one or more programs, or portion(s) thereof, may be embodied in software stored on a tangible computer readable storage medium such as a CD-ROM, a floppy disk, a hard drive, a digital versatile disk (DVD), a Blu-ray Disk™, or a memory associated with the processor 412, but the entire program or programs and/or portions thereof could alternatively be executed by a device other than the processor 412 and/or embodied in firmware or dedicated hardware (e.g., implemented by an ASIC, a PLD, an FPLD, discrete logic, etc.). Further, although the example program(s) is(are) described with reference to the flowchart illustrated in FIG. 3, many other methods of implementing the example watermark modification detector 100, the example media signal sampler 105, the example watermark encoder 115, the example watermark decoder 120 and/or the example watermark modification evaluator 135 may alternatively be used. For example, with reference to the flowchart illustrated in FIG. 3, the order of execution of the blocks may be changed, and/or some of the blocks described may be changed, eliminated, combined and/or subdivided into multiple blocks.

As mentioned above, the example process of FIG. 3 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 3 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the terms "comprising" and "including" are open ended. Also, as used herein, the terms "computer readable" and "machine readable" are considered equivalent unless indicated otherwise.

An example program 300 that may be executed to implement the example watermark modification detector 100 of FIG. 1 is illustrated in FIG. 3. With reference to the preceding figures and associated written descriptions, the example program 300 of FIG. 3 begins execution at block 305 at which the example media signal sampler 105 of the watermark modification detector 100 samples a media signal, which may include a first (e.g., original) watermark (e.g., a local watermark) associated with a first watermarking level (e.g., a local level), output from the example media device 110, as described above. At block 310, the example watermark encoder 115 of the watermark modification detector 100 encodes a second (e.g., added) watermark (e.g., a network watermark) associated with a second watermarking level (e.g., a network level) in the sample media signal, as described above. At block 315, the example watermark decoder 120 of the watermark modification detector 100 performs a watermark detection procedure, as described above, to detect the first (e.g., original) and second (e.g., added) watermarks encoded in the media signal, as described above. If the watermark decoder 120 does not detect both types of watermarks (block 320), processing proceeds to block 325 at which the watermark modification detector 100 indicates (e.g., via an output/transmitted report, message, signal, etc.) that it was not possible to determine whether the first (e.g., original) watermark associated was modified (e.g., boosted or otherwise enhanced) at the media source (e.g., radio or television station) after originally being encoded in the media signal.

However, if the watermark decoder 120 does detect both types of watermarks (block 320), at block 330, the example watermark modification evaluator 135 of the watermark modification detector 100 determines a combined (e.g., average) symbol strength metric for the first (e.g., original) watermark symbols, as described above. At block 335, the example watermark modification evaluator 135 determines a combined (e.g., average) symbol strength metric for the second (e.g., added) watermark symbols, as described above. If the symbol strength metric for the first (e.g., original) watermark symbols is greater than the symbol strength metric for the second (e.g., added) watermark symbols (block 340) by a threshold amount, then at block 345, the watermark modification evaluator 135 indicates, as described above, that watermark modification (e.g., boosting or other enhancement) has been detected. However, if the symbol strength metric for the first (e.g., original) watermark symbols is not greater than the symbol strength metric for the second (e.g., added) watermark symbols (block 340) by the threshold amount, then at block 350, the watermark modification evaluator 135 indicates, as described above, that watermark modification (e.g., boosting or other enhancement) has not been detected. At block 355, the watermark modification evaluator 135 reports, as described above, the watermark modification determinations made at block 345 or block 350. Execution of the example program 300 then ends.

Figure 4:
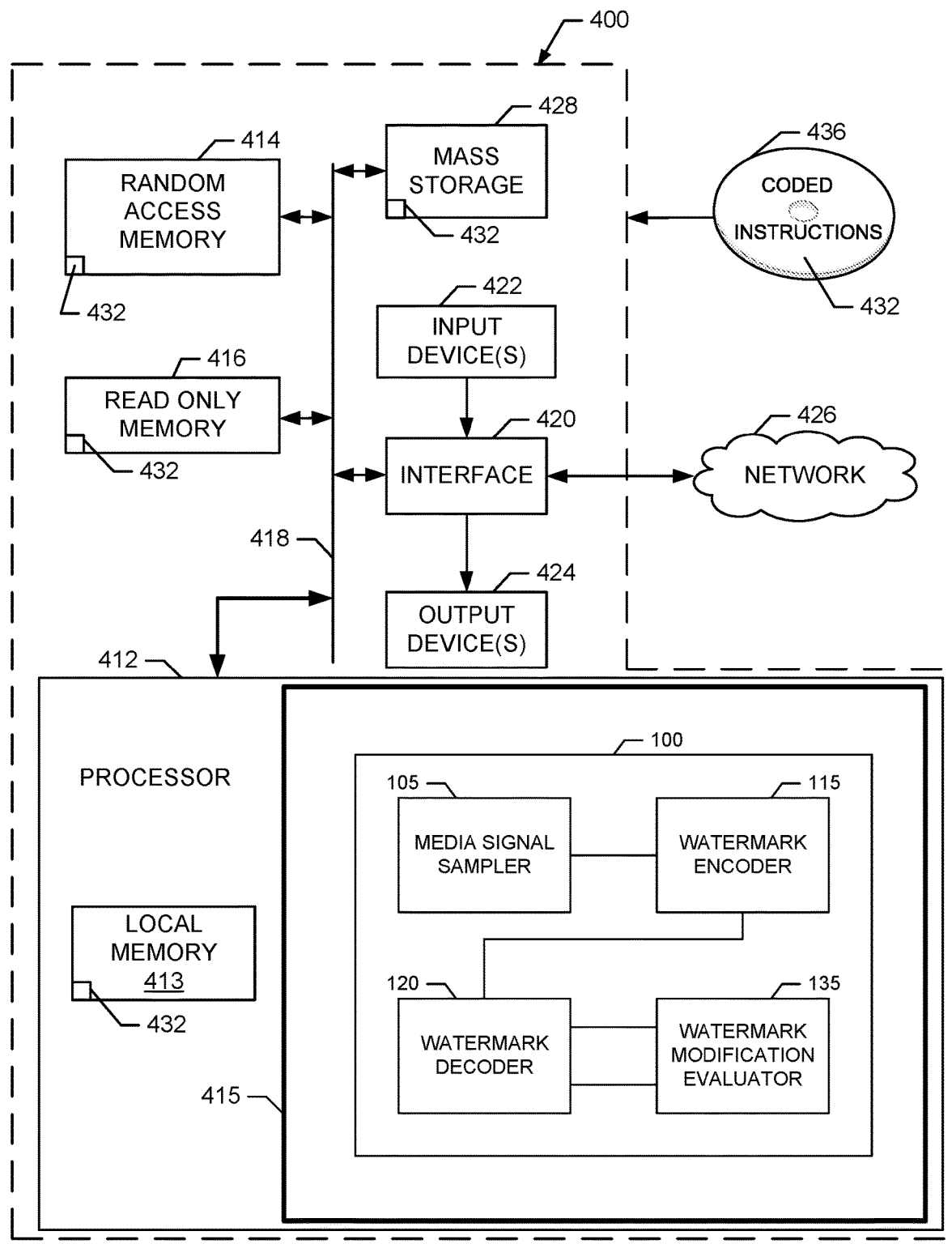
FIG. 4 is a block diagram of an example processor platform structured to execute the example machine readable instructions of FIG. 3 to implement the example watermark modification detector of FIG. 1.

FIG. 4 is a block diagram of an example processor platform 400 structured to execute the instructions of FIG. 3 to implement the example watermark modification detector 100 of FIG. 1. The processor platform 400 can be, for example, a server, a personal computer, a mobile device (e.g., a cell phone, a smart phone, a tablet such as an iPad™), or any other type of computing device.

The processor platform 400 of the illustrated example includes a processor 412. The processor 412 of the illustrated example is hardware. For example, the processor 412 can be implemented by one or more integrated circuits, logic circuits, microprocessors or controllers from any desired family or manufacturer. In the illustrated example of FIG. 4, the processor 412 includes one or more example processing cores 415 configured via example instructions 432, which include the example instructions of FIG. 3, to implement the example media signal sampler 105, the example watermark encoder 115, the example watermark decoder 120 and/or the example watermark modification evaluator 135 of FIG. 1.

The processor 412 of the illustrated example includes a local memory 413 (e.g., a cache). The processor 412 of the illustrated example is in communication with a main memory including a volatile memory 414 and a non-volatile memory 416 via a link 418. The link 418 may be implemented by a bus, one or more point-to-point connections, etc., or a combination thereof. The volatile memory 414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), and/or a PCI express interface.

In the illustrated example, one or more input devices 422 are connected to the interface circuit 420. The input device(s) 422 permit(s) a user to enter data and commands into the processor 412. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 400, can allow the user to control the computer system and provide data to the computer using physical gestures, such as, but not limited to, hand or body movements, facial expressions, and face recognition.

One or more output devices 424 are also connected to the interface circuit 420 of the illustrated example. The output devices 424 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 420 of the illustrated example, thus, typically includes a graphics driver card, a graphics driver chip or a graphics driver processor.

The interface circuit 420 of the illustrated example also includes a communication device such as a transmitter, a receiver, a transceiver, a modem and/or network interface card to facilitate exchange of data with external machines (e.g., computing devices of any kind) via a network 426 (e.g., an Ethernet connection, a digital subscriber line (DSL), a telephone line, coaxial cable, a cellular telephone system, etc.).

The processor platform 400 of the illustrated example also includes one or more mass storage devices 428 for storing software and/or data. Examples of such mass storage devices 428 include floppy disk drives, hard drive disks, compact disk drives, Blu-ray disk drives, RAID (redundant array of independent disks) systems, and digital versatile disk (DVD) drives.

Coded instructions 432 corresponding to the instructions of FIG. 3 may be stored in the mass storage device 428, in the volatile memory 414, in the non-volatile memory 416, in the local memory 413 and/or on a removable tangible computer readable storage medium, such as a CD or DVD 436.

Further implementation details concerning example methods, apparatus, systems and articles of manufacture (e.g., physical storage media) to detect media watermark modifications in accordance with the teachings of this disclosure are provided in the Appendix.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to detect watermark modifications, the apparatus comprising:
  means for encoding a first watermark in a first media signal obtained from an output of a media device to obtain a second media signal encoded with the first watermark and a second watermark, the second watermark already encoded in the first media signal obtained from the output of the media device;
  means for decoding the first watermark and the second watermark from the second media signal, the means for decoding to:
    determine, from the second media signal, a first metric corresponding to the first watermark;
    determine, from the second media signal, a second metric corresponding to the second watermark; and
  means for outputting, based on the first metric and the second metric, an indication of whether the second watermark has been modified.

2. The apparatus of claim 1, wherein the means for outputting is to determine whether the second metric exceeds the first metric by at least a threshold amount, and the indication is to indicate the second watermark has been modified when the second metric exceeds the first metric by at least the threshold amount.

3. The apparatus of claim 2, wherein the indication is to indicate the second watermark has not been modified when the second metric does not exceed the first metric by at least the threshold amount.

4. The apparatus of claim 1, wherein the first watermark is associated with a first watermark layer, the second watermark is associated with a second watermark layer different from the first watermark layer, the first watermark layer is associated with a first set of code tones to represent symbols of the first watermark, and the second watermark layer is associated with a second set of code tones to represent symbols of the second watermark, the second set of code tones different from the first set of code tones.

5. The apparatus of claim 1, wherein to determine the first metric and to determine the second metric, the means for decoding is to:
  determine, from the second media signal, symbol strength metrics for symbols of the first watermark;
  combine the symbol strength metrics for the symbols of the first watermark to determine the first metric;
  determine, from the second media signal, symbol strength metrics for symbols of the second watermark; and
  combine the symbol strength metrics for the symbols of the second watermark to determine the second metric.

6. The apparatus of claim 5, wherein the means for decoding is to:
  average the symbol strength metrics for the symbols of the first watermark to combine the symbol strength metrics for the symbols of the first watermark; and
  average the symbol strength metrics for the symbols of the second watermark to combine the symbol strength metrics for the symbols of the second watermark.

7. A system to detect watermark modifications, the system comprising:
  means for encoding a second watermark in a sampled media signal obtained from a received broadcast signal, the sampled media signal already encoded with a first watermark that was included in the received broadcast signal;
  means for decoding the first watermark and the second watermark from the sampled media signal;

means for comparing a first metric determined for the first watermark and a second metric determined for the second watermark to determine whether the first watermark was modified prior to being included in the received broadcast signal; and means for revising ratings data corresponding to the received broadcast signal when the first watermark is determined to have been modified prior to being included in the received broadcast signal.

8. The system of claim 7, wherein the means for revising is to discard the ratings data when the first watermark is determined to have been modified prior to being included in the received broadcast.

9. The system of claim 7, wherein the received broadcast signal is a received radio station signal, and the sampled media signal is a sampled audio signal obtained from the received radio station signal.

10. The system of claim 7, wherein the first metric is a first signal strength metric determined for the first watermark and the second metric is a second signal strength metric determined for the second watermark.

11. The system of claim 10, wherein the means for comparing is to:

determine the first watermark was modified prior to being included in the received broadcast when the first signal strength metric exceeds the second signal strength metric by at least a threshold amount; and determine the first watermark was not modified prior to being included in the received broadcast when the first signal strength metric does not exceed the second signal strength metric by at least a threshold amount.

12. The system of claim 7, wherein the means for encoding is to encode the second watermark to overlap in time with the first watermark in the sampled media signal.

13. The system of claim 12, wherein the means for encoding is to employ frequency multiplexing to encode the second watermark to overlap in time with the first watermark in the sampled media signal.

14. A watermark modification detector comprising:

means for encoding a second watermark in a sampled media signal obtained from a broadcast media signal received by a media device, the sampled media signal including a first watermark that was included in the broadcast media signal;

means for decoding the first watermark and the second watermark from the sampled media signal; and means for comparing a first strength metric determined for the first watermark and a second strength metric determined for the second watermark to determine whether the first watermark was modified prior to being encoded in the broadcast media signal that was received by the media device.

15. The watermark modification detector of claim 14, wherein the first watermark is encoded in a first watermarking layer of the sampled media signal, and the means for encoding is to encode the second watermark in a second watermarking layer of the sampled media signal.

16. The watermark modification detector of claim 15, wherein the second watermarking layer is an unused watermarking layer of the sampled media signal.

17. The watermark modification detector of claim 14, wherein the means for decoding is to:

sum energies of respective ones of a first set of code tones of the sampled media signal corresponding to symbols of the first watermark to determine the first strength metric; and sum energies of respective ones of a second set of code tones of the sampled media signal corresponding to symbols of the second watermark to determine the second strength metric.

18. The watermark modification detector of claim 17, wherein the respective energy of one of the first set of code tones is normalized based on a first average energy determined for a first code band of the sampled media signal including the one of the first set of code tones, and the respective energy of one of the second set of code tones is normalized based on a second average energy determined for a second code band of the sampled media signal including the one of the second set of code tones.

19. The watermark modification detector of claim 14, wherein the means for comparing is to determine whether the second metric determined for the second watermark exceeds the first metric determined for the first watermark by at least a threshold value.

20. The watermark modification detector of claim 19, wherein the means for comparing is to:

determine the first watermark was modified prior to being encoded in the broadcast media signal when the second metric exceeds the first metric by at least the threshold value;

determine the first watermark was not modified prior to being encoded in the broadcast media signal when the second metric does not exceed the first metric by at least the threshold value; and report, via a network, information indicating whether the first watermark was modified prior to being encoded in the broadcast media signal.

* * * * *